June 23, 1970  E. MARIN  3,516,200

TREE PROP

Filed Feb. 27, 1968

INVENTOR.
EMIL MARIN
BY
HIS ATTY'S

United States Patent Office 3,516,200
Patented June 23, 1970

3,516,200
TREE PROP
Emil Marin, 419 Elliott St., Port Arthur,
Ontario, Canada
Filed Feb. 27, 1968, Ser. No. 708,620
Int. Cl. A01g 23/00; B26b 29/00
U.S. Cl. 47—43                10 Claims

ABSTRACT OF THE DISCLOSURE

A light weight telescopic pulp wood prop and measuring guide having a retractable and extendable spring loaded prong or spike at one end and a sole plate at the other end.

---

This invention relates to new and useful improvements in tree props and measuring guides.

In the felling of trees, particularly the felling of trees for pulp wood, a chain saw is normally used by one operator. These relatively small diameter trees are pushed in the desired direction of fall by the operator or, alternatively, are proposed in the slightly tilted position while the cut is completed. It is normal for operators to cut saplings for this purpose. There are not only dangerous inasmuch as there is no means for embedding the end of the sapling within the tree but it is wasteful from a conservation standpoint.

Once the trees are felled it is necessary for the operator to cut them into predetermined lengths, for example, 100", prior to the pulp logs being transported to the plant.

Here again it is normal for the operator to use a sapling as a gauge for the necessary measurement.

The present device overcomes the disadvantages of the use of saplings by providing a light weight telescopic tubular pole having a pin on one end which may engage within the bark of the tree. A pin guard is provided covering the pin under normal circumstances but which permits the pin to be extended as soon as pressure is applied upon the guard by the use of the pole against the tree.

The telescopic pole, when in the extended position, is a predetermined length and can be used as a guide by the operator in the cutting of the felled trees into pulp wood lengths.

The principal object and essence of the invention is to provide a device of the character herewithin described which can be used in the felling of trees for pulpwood either as a prop or as a guiding or gauging device.

Another object of the invention is to provide a device of the character herewithin described in which the bar engaging pin is normally covered or protected by means of a pin component guard.

A further object of the invention is to provide a device of the character herewithin described which, when extended, is of a predetermined length so that it can be used as a gauge for the cutting of the trees into pulpwood lengths.

A still further object of the invention is to provide a device of the character herewithin described in which, when telescoped, is light and easy to carry.

Still another object of the invention is to provide a device of the character herewithin described which is simple in construction, economical in manufacture, and otherwise well suited to the purpose for which it is designed.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which.

In the drawings like characters of reference indicate corresponding parts in the different figures.

Figure 1:
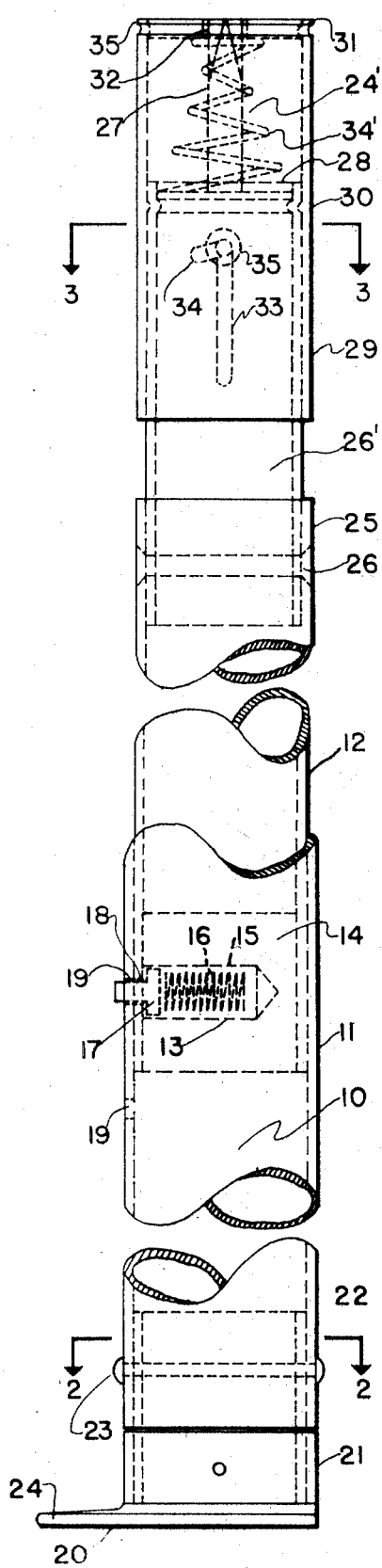
FIG. 1 is a side elevation of the device shown in the extended position.

Proceeding therefore to describe the invention in detail, the device consists of an elongated pole collectively designated 10 comprising a first portion 11 which is preferably constructed of tubular aluminum or the like.

A second portion 12 also preferably constructed of tubular aluminum, is slidably receivable within the first section 11 and means collectively designated 13 are provided cooperating between the two sections to maintain them in the extended position.

A cylindrical portion 14 is inserted and secured within the end of the second portion 12 and a transverse drilling 15 is formed in the cylindrical portion 14 to receive a spring 16 therein. A shouldered button 17 is mounted in the drilling and is acted upon by the spring 16 normally urging the button outwardly. An aperture 18 is formed through the wall of the second portion in alignment with drilling 15 and the smaller end of the button extends through this aperture, the larger end retaining the button in the drilling as shown.

The first portion 11 is provided with a plurality of drillings 19 through the wall thereof, any one of which is engageable by the small end of the shouldered button 17 when the second portion is in the extended position in order to provide adjustment and alternatively an extended pole of a different length.

A heel collectively designated 20 is secured to one end 21 of the first portion 11, said heel comprising a relatively short length of tube 22 engageable within the end 21 of the first portion 11. A rivet 23 secures this tube within the end as clearly shown in FIGS. 1 and 2.

Figure 2:
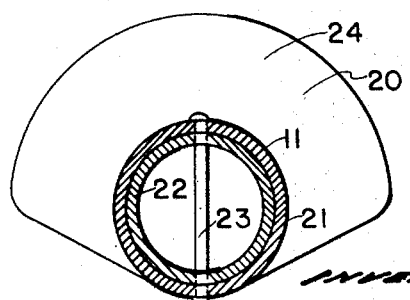
FIG. 2 is a sectional along the line 2—2 of FIG. 1.

A plate or flange 24 is secured to the end of the tube 22 and extends at right angles therebeyond, said plate being a segment of a circle as clearly shown in FIG. 2. This heel may be used by the operator to manipulate the pole, or, alternatively, facilitates the engagement of the end 21 within the ground when the device is used as a prop.

A pin component 24' is secured within the end 25 of the second section 12 as by rivets 26, said pin component comprising a tubular portion 26' engageable within the end 25. A pin 27 is secured to and extends axially from the outer end 28 of the tubular portion 26 and this pin is adapted to engage the bark of the tree upon which the device is used.

It is desirable to protect this pin when not in use and in this connection I have provided a pin guard collectively designated 29.

Figure 5:
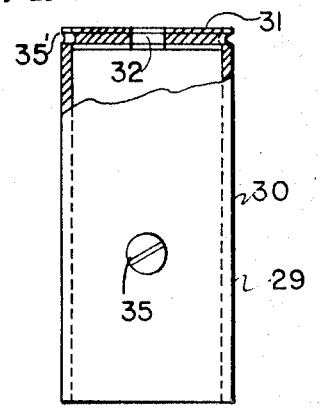
FIG. 5 is a longitudinal sectional view of the pin guard per se.
Figure 4:
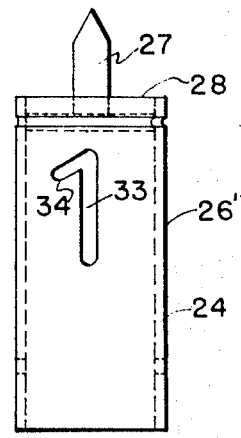
FIG. 4 is a side elevation of the pin component per se.
Figure 3:
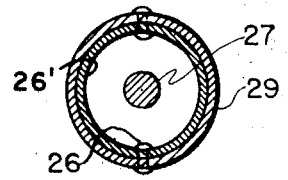
FIG. 3 is a section along the line 3—3 of FIG. 1.

It consists of a tubular member 30 having an end piece 31 secured across one end thereof as clearly shown in FIG. 5. This end piece is centrally apertured as at 32 and the pin 27 is adapted to pass through this aperture.

The tubular portion 30 is slidably engageable over the tubular portion 26' of the pin component 24 as clearly illustrated in FIG. 1.

A longitudinally extending closed ended slot 33 is formed through the wall of the tubular portion 26', and having the outer end 34 formed at an acute angle from the main length of the slot. Slot engaging means 35 in the form of a self-tapping screw is engaged through the wall of the tubular member 30 and engages within slot 33 thus mounting the guard in slidable relationship upon the portion 26'.

A helical coil spring 34' extends between the end 28 of the cylindrical portion 26' and the end piece 31 of the guard 29 surrounding the pin 27 and normally maintaining the guard in the position shown in FIG. 1 thus guarding the pin 27. However, when the pole is engaged at an angle with the side of a tree, the corner or junction 35' between the end piece 31 and the cylindrical portion 30 engages the bark of the tree, and pressure upon the pole by the operator causes the pin to extend thus engaging the bark of a tree, and preventing the device from slipping as the tree is being manipulated or propped.

When the tree has been felled, the assembly can be used to measure off the desired length for cutting the tree into pulpwood.

When it is desired to transport the device, the button 17 is depressed so that it disengages from the aperture 19 thus enabling the second portion 12 of the pole to be slid within the first portion 11.

The guard 29 normally moves endwise upon the portion 24 but if it is desired to lock the guard in the pin guarding position then the guard is rotated slightly so that the screw 35 enters the acute angled end 34 of the slot thus detachably locking the guard against retracting movement.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor thereof is entitled, as justice dictates.

What I claim as my invention is:

1. A tree prop comprising in combination an elongated pole, a heel plate on one end thereof, a tree engaging pin component on the other end, and a pin guard slidable over said pin component within limits, said pin extended through the end of said guard when said guard is in the retracted position, and spring means reacting between said guard and said pin component normally maintaining said guard in the extended, pin guarding position, said pin component comprising a tubular member secured by one end thereof to said other end of said pole and extending therefrom, and a pin extending axially from the other end of said tubular member, said pin guard comprising a further tubular member, slidably engaging over said tubular member, a centrally apertured end piece secured to said further tubular member and closing one end thereof, said pin being engageable through said aperture, and means mounting said further tubular member for lengthwise movement, within limits, upon said tubular member, said spring means reacting between said end piece and the end of said tubular member.

2. The device according to claim 1 in which said pole includes a first tubular portion, said heel being secured to one end of said first portion and a second tubular portion telescopically mounted within the other end of said first portion, said pin being secured to the outer end of said second portion, and means coacting between said first and second portions to detachably secure said portions in the extended position.

3. The device according to claim 2 in which said heel comprises a tubular cap secured over said one end, and a flange extending from said tubular cap, said flange comprising a segment of a circle.

4. The device according to claim 1 in which said means mounting said further member includes a longitudinally extending closed ended slot formed through the wall of said tubular member, the outer end of said slot extending at an acute angle from said slot, means extending from said further tubular member and into said slot in sliding relationship with said slot.

5. The device according to claim 2 in which said means mounting said further member includes a longitudinally extending closed ended slot formed through the wall of said tubular member, the outer end of said slot extending at an acute angle from said slot, means extending from said further tubular member and into said slot in sliding relationship with said slot.

6. The device according to claim 3 in which said means mounting said further member includes a longitudinally extending closed ended slot formed through the wall of said tubular member, the outer end of said slot extending at an acute angle from said slot, means extending from said further tubular member and into said slot in sliding relationship with said slot.

7. A tree prop comprising in combination an elongated pole, a heel plate on one end thereof, a tree engaging pin component on the other end, and a pin guard slidable over said pin component within limits, said pin extended through the end of said guard when said guard is in the retracted position, and spring means reacting between said guard and said pin component normally maintaining said guard in the extended, pin guarding position, said pole including a first tubular portion, said heel being secured to one end of said first portion and a second tubular portion telescopically mounted within the other end of said first portion, said pin being secured to the outer end of said second portion, and means coacting between said first and second portions to detachably secure said portions in the extended position.

8. The device according to claim 7 in which said heel comprises a tubular cap secured over said one end, and a flange extending from said tubular cap, said flange comprising a segment of a circle.

9. The device according to claim 7 in which said pin component comprising tubular member secured by one end thereof to said other end of said pole and extending therefrom, and a pin extending axially from the other end of said tubular member, said pin guard comprising a further tubular member, slidably engaging over said tubular member, a centrally apertured end piece secured to said further tubular member and closing one end thereof, said pin being engageable through said aperture, and means mounting said further tubular member for lengthwise movement, within limits, upon said tubular member, said spring means reacting between said end piece and the end of said tubular member.

10. The device according to claim 7 in which said means mounting said further member includes a longitudinally extending closed ended slot formed through the wall of said tubular member, the outer end of said slot extending at an acute angle from said slot, means extending from said further tubular member and into said slot in sliding relationship with said slot.

References Cited

UNITED STATES PATENTS 2,941,511  6/1960  Ciermans.

FOREIGN PATENTS 116,302  1/1949  Sweden.
162,003  9/1946  Austria.

WILLIAM S. LAWSON, Primary Examiner

L. GILDEN, Assistant Examiner

U.S. Cl. X.R.

30—286; 248—354; 269—53; 294—61